United States Patent [19]
Walther et al.

[11] 3,897,112
[45] *July 29, 1975

[54] RIM MOUNTING

[75] Inventors: William D. Walther, Kettering; Robert A. DeRegnaucourt, Centerville, both of Ohio

[73] Assignee: Dayton-Walther Corporation, Dayton, Ohio

[*] Notice: The portion of the term of this patent subsequent to Oct. 22, 1991, has been disclaimed.

[22] Filed: Dec. 26, 1973

[21] Appl. No.: 428,088

Related U.S. Application Data

[63] Continuation-in-part of Ser. No. 325,510, Jan. 22, 1973.

[52] U.S. Cl. ............ 301/13 SM; 85/1 R; 301/11 R; 301/12 R
[51] Int. Cl. ............................................ B60b 23/10
[58] Field of Search .... 301/10 R, 12 R, 11 R, 13 R, 301/13 SM, 36 R, 19, 20; 85/1 R, 9 W; 151/14.5

[56] References Cited
UNITED STATES PATENTS

| | | | |
|---|---|---|---|
| 1,139,479 | 5/1915 | Brightman | 85/9 W |
| 2,819,118 | 1/1958 | Fahlman | 301/13 SM |
| 3,061,455 | 10/1962 | Anthony | 151/14.5 |
| 3,259,437 | 7/1966 | Malthaner | 301/20 |

FOREIGN PATENTS OR APPLICATIONS

| | | | |
|---|---|---|---|
| 189,626 | 12/1922 | United Kingdom | 85/1 R |

Primary Examiner—Robert S. Ward, Jr.
Assistant Examiner—Reinhard J. Eisenzopf
Attorney, Agent, or Firm—Mack D. Cook, II

[57] ABSTRACT

In the original invention, Ser. No. 325,510, filed Jan. 22, 1973, rotatable support bolts carrying fastening nuts moving clamp elements into engagement with a rim flange are rotated to a predetermined first stage position to correctly align the rim on a wheel. Thereafter, the fastening nuts are rotated relative to the support bolts to provide a second stage position so as to fully seat the rim on the wheel without distortion or misalignment. In this invention, the support bolt, the fastening nut and the clamp element are pre-assembled or unitized in combination with a stop collar formed on the medial portion of the support bolt, and a cap head secured on the axially outer end of the support bolt, to provide a factory made assembly. The stop collar is formed at a precise location according to predetermined functional dimensions and tolerances assuring achievement of first-stage positioning so as to correctly align the rim on the wheel prior to second-stage tightening of the rim on the wheel. The cap head is secured by various metallurgical techniques involving the application of heat energy or by adhesive bonding.

10 Claims, 21 Drawing Figures

RIM MOUNTING

CROSS-REFERENCE TO RELATED APPLICATIONS

The subject matter of the invention is a Continuation-in-Part of co-pending application Ser. No. 325,510, filed Jan. 22, 1973.

BACKGROUND OF THE INVENTION

The invention relates to the mounting of tire carrying rims, either single or dual, on a wheel, either front or rear, of a vehicle, such as a truck or trailer.

The subject matter of co-pending application Ser. No. 325,510, filed Jan. 22, 1973, relates to an assembly for two-stage mounting of single or dual rims on a wheel with extreme accuracy.

In application Ser. No. 325,510, rotatable support bolts carrying fastening nuts moving clamp elements into engagement with the rim flange are rotated to a predetermined first-stage position to correctly align the rim on the wheel. Thereafter, the fastening nuts are rotated relative to the support bolts to further move the clamp elements axially inwardly to provide a second-stage tightening of the rim on the wheel without distortion or misalignment.

In each embodiment of a two-stage assembly 20, as disclosed in application Ser. No. 325,510, the first-stage position of the support bolt 26 is determined by a stop means 31.

The rotatable support bolt 26 of application Ser. No. 325,510, has a cap head 30, a medial portion 40 and an axially inner portion 38. The stop means 31 is provided by a radially oriented surface 39, formed as by precision machining, between the smaller diameter axial inner portion 38 and the larger diameter medial portion 40. The axially inner portion 38 of the support bolt is inserted into a wheel bore 25 and rotated until the stop surface 39 has contacted a wheel boss surface 37.

It has now been found that a modification of the cap head 30 and the stop means 31 for the rotatable support bolt 26 of application Ser. No. 325,510, will decrease the cost of manufacture of the assembly, will provide an assembly which is unitized so that the components thereof cannot be lost or misplaced by the mechanic when making a tire change, and will provide an assembly which can be made to have and maintain precise and predetermined functional dimensions and tolerances, as required for correctly aligning various types or styles of a rim flange on the wheel during first-stage positioning and prior to second-stage tightening.

SUMMARY OF THE INVENTION

The object of the invention is to provide an improved two-stage assembly for mounting single or dual tire carrying rims on a wheel.

It is a further object of the invention to provide an improvement for first-stage positioning and second-stage tightening of single or dual rims with accuracy so as to assure lateral alignment and minimize radial runout of the rims when mounted.

Still further, it is an object of the invention to provide a two-stage assembly which can be made at a lower cost, which is unitized so that components thereof cannot be lost or misplaced, and which can be made to have and maintain predetermined dimensional tolerances as required for correctly aligning a specific type or style of rim flange on a wheel during first-stage positioning and prior to second-stage tightening.

These and other objects of the invention, and the advantages thereof, will be apparent in view of the Description of a Preferred Embodiment and alternative embodiments, as set forth below.

In general, as assembly for rim mounting according to the invention comprises a series or sets of support bolts, fastening nuts and clamp elements. The wheel has a series of axially directed bores adjacent the wheel felloe for rotatably receiving the external threads on the axially inner end of a support bolt. A fastening nut is rotatably mounted on the external threads on the medial portion of the support bolt. Each fastening nut has a radially oriented flange surface for engaging a clamp element. Each clamp element has an axially directed bore for housing a support bolt and an axially directed portion for engaging the rim mounting flange. A stop collar is formed on the medial portion of the support bolt. The stop collar has an effective outer diameter greater than the inner diameter of the bore in the clamp element so as to retain the clamp element and the fastening nut on the support bolt. The axially outer portion of a support bolt has a cap head secured thereon which when rotated will cause a fastening nut on the bolt threads and in contact with the cap head to engage a clamp element and move the clamp element axially toward, and into engagement with, the rim mounting flange.

The stop collar provides a precisely located stop means on the medial portion of a support bolt to limit the extent of axially inward movement of the fastening nut and clamp element and thereby establish a first-stage position for rim mounting. By providing for first-stage positioning, the rim is prevented from being drawn off side or out of alignment by the first clamping elements and is therefore correctly aligned on the wheel felloe. Subsequent rotation of the fastening nut away from the secured cap head will move the clamp element further axially inwardly and thereby provide a second-stage position for rim mounting. During the second-stage of rim mounting, the clamp elements will be tightened so as to fully seat the rim on the wheel felloe without distortion or misalignment.

DESCRIPTION OF THE DRAWINGS

In FIGS. 1 and 2, the cap head of the support bolt is a cap nut secured by a weld.

FIGS. 7 and 8 show a cap nut secured to the support bolt by a resistance weld;

FIGS. 9 and 10 show a hex member secured to the support bolt by a stud or friction weld;

FIGS. 11 and 12 show a nut with a hex bore secured on the support bolt by a mechanically formed rivet head;

FIGS. 13, 14 and 15 show nut secured to the support bolt by a resistance weld, FIG. 14 being taken substantially as indicated on line 14—14 of FIG. 13;

FIG. 16 shows a nut secured to the support bolt by plug weld;

FIGS. 17 and 18 show a nut secured to the support bolt by a fillet weld;

FIG. 19 shows a cap nut, similar to FIGS. 1 and 2, secured by a resistance weld; and FIGS. 20 and 21 show a cap nut, similar to FIG. 19, secured by an adhesive bond.

DETAILED DESCRIPTION OF THE INVENTION

Figure 2:
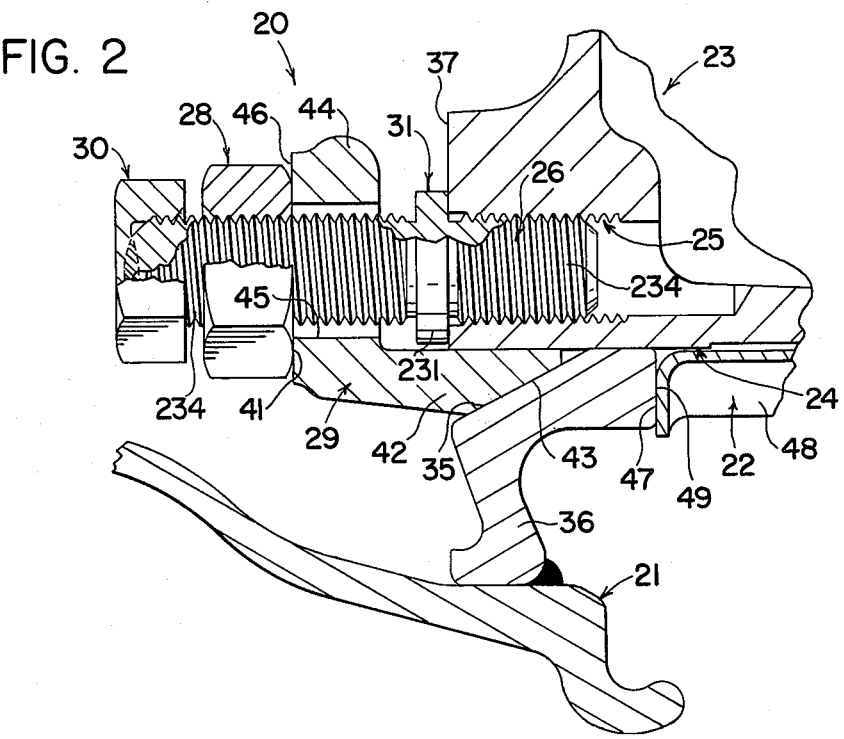
FIG. 2 is a fragmentary view of a dual rim mounting according to the invention.

A rim mounting according to the invention is referred to generally by the numeral 20. The rims, whether single or dual inner and outer rims, are referred to generally by the numeral 21. In FIG. 2, the spacer for dual rim mounting is referred to generally by the numeral 22. The wheel is referred to generally by the numeral 23 with the wheel felloe, felly or load-bearing surface being referred to generally by the numeral 24 and with a series of axially directed bores adjacent the wheel felloe 24 being referred to generally by the numeral 25.

The support bolt of each assembly 20 is referred to generally by the numeral 26. The fastening nut of an assembly 20 rotatably mounted on the support bolt 26 is referred to generally by the numeral 28. The axially directed portion of a clamp element of an assembly 20 for engaging a rim 21 is referred to generally by the numeral 29. The cap head of a support bolt is referred to generally by the numeral 30. The integral stop collar on the support bolt 26 providing the stop means for first-stage positioning is referred to generally by the numeral 31.

Figure 1:
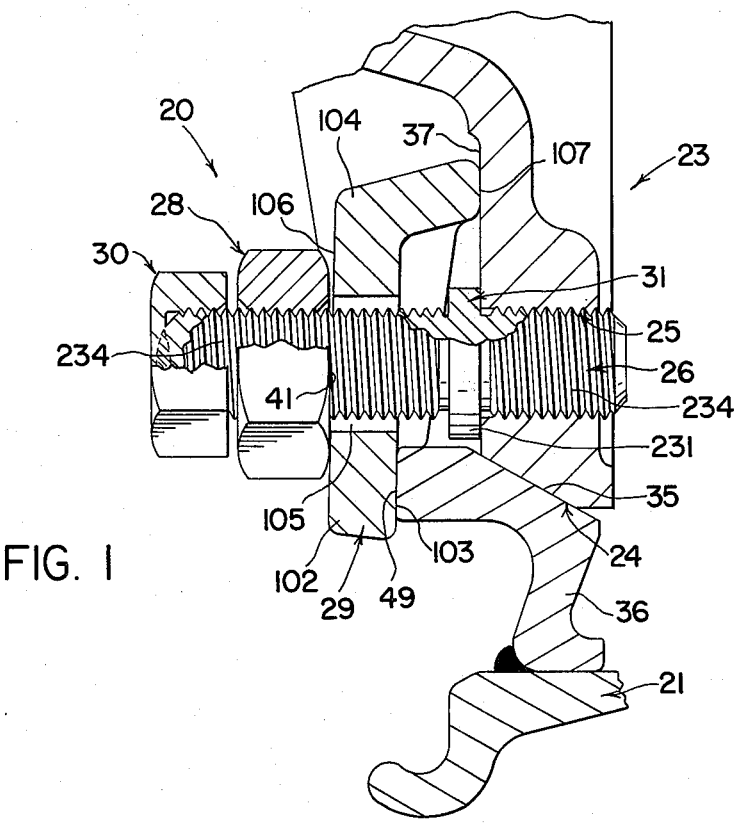
FIG. 1 is a fragmentary view of a single rim mounting according to the invention.

In FIG. 1, the assembly 20 is shown as used for the mounting of a single rim 21 on the wheel 23. The felly surface 24 is inclined for mating engagement with a radially inclined surface 35 on the mounting flange 36 of the rim 21. The axially outer end of the felly surface 24 terminates in radially oriented boss surfaces 37.

In FIG. 2, the assembly 20 is shown as used for the mounting of dual inner and outer rims 21 separated by a rigid spacer 22 on a wheel 23. As shown in detail in application Ser. No. 325,510, the wheel 23 has a relatively wide felly surface 24 with an inclined surface 34 at the axially inner end for mating engagement with a radially inclined surface 35 on the mounting flange 36 of an inner rim 21. The axially outer end of the felly surface 24 terminates in radially oriented boss surfaces 37.

In both FIGS. 1 and 2, the internally threaded bores 25 for rotatably receiving the support bolts 26 extend axially inwardly from the boss surfaces 37.

In both FIGS, 1 and 2, the fastening nut 28 has an axially inner or base portion providing a radially oriented flange surface 41 for engaging a clamp means including the clamp element 29.

In FIG. 2, the clamp element 29 is provided by the axially directed leg 42 of a conventional one-piece clamp lug slidably engaging the felly surface 24 and having an inclined surface 43 for mating engagement with a radially inclined surface 35 on the mounting flange 36 of an outer rim 21. The axially directed leg 42 intersects a radially directed leg 44 with an axially directed bore 45 housing a support bolt 26 and having an axially outer surface 46 for engagement with a fastening nut flange surface 41. The rigid spacer 22 is a conventional annular spacer or spacer ring carried on the felly surface 24. The spacer has lateral flanges or marginal portions 47 carried by a non-compressible medial portion 48. The spacer edges 47 are preferably oriented substantially vertically or perpendicular to the rotational axis of the wheel 23 for mating engagement with a radially oriented surface 49 on the mounting flange 36 of the inner and outer rims 21.

Figure 3:
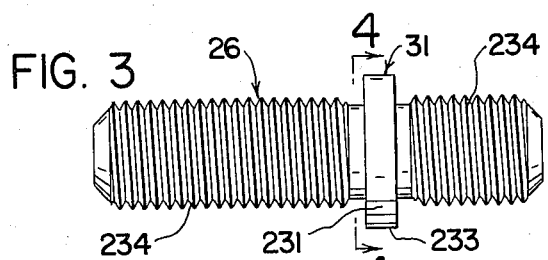
FIG. 3 is a plan view of a rotatable support bolt for use in an assembly according to the invention having an elliptical stop collar.
Figure 4:
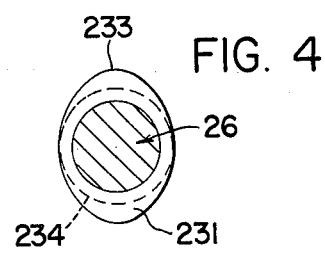
FIG. 4 is a sectional view taken substantially as indicated on line 4—4 of FIG. 3.
Figure 5:
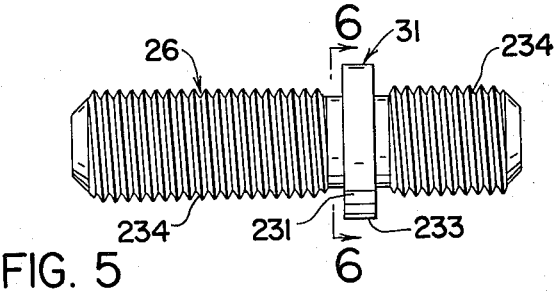
FIG. 5 is a plan view of a rotatable support bolt for use in an assembly according to the invention having a circular stop collar.
Figure 6:
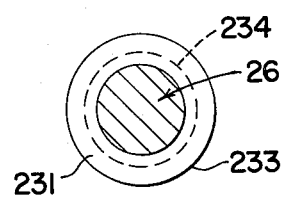
FIG. 6 is a sectional view taken substantially as indicated on line 6—6 of FIG. 5.

The numerals 50 through 99, are not used in this Specification. However, reference is made to the various types and styles of flanges for rims 21 and to various configurations for clamp elements 29, as described and disclosed in FIGS. 2, 3 and 4 of application Ser. No. 325,510, as being illustrative of rim mountings which could be made using the assembly 20 according to the invention of this application.

In FIG. 1, the clamp element 29 is provided by the axially directed leg 102 of a one-piece clamp lug having a radially oriented surface 103 for mating engagement with the surface 49 on the mounting flange 36 of the rim 21. The axially directed leg 102 intersects a radially directed leg 104 with an axially directed bore 105 housing a support bolt 26 and having an axially outer surface 106 for engagement with the fastening nut flange surface 41. The radially inner end of a clamp leg 104 has an axially inwardly directed portion 107 for engagement with the wheel 23 during positioning by the assembly 20.

The numerals 108 through 230, are not used in this Specification.

THE STOP COLLAR

As best shown in FIGS. 3–6, according to this invention the stop means 31 for providing the first-stage position of a support bolt 26 is a stop collar 231 formed integrally, as by forging, and/or machining, on the support bolt 26. The stop collar 231 is formed integrally at a precise location according to predetermined functional dimensions and tolerances of a rim flange 36 and a wheel 23.

The circumferential surface 233 of a stop collar 231 may be elliptical (see, FIG. 4) or circular (see, FIG. 6) or polygonal. When the stop collar surface 233 is circular or polygonal, with the effective diameter thereof being greater than the inner diameter of the bore (45 or 105) in the radially directed leg (44 or 104) of a clamp element 29, the assembly 20 is unitized after the cap head 30 is secured on the support bolt 26. When the stop collar surface 233 is elliptical, or "egg-shaped", the clamp element bore (45 or 105) is correspondingly dimensioned providing for "key-hole" disassembly of a clamp element 29 from the support bolt 26 of the assembly 20.

The shank of the support bolt 26 may be formed with circumferentially continuous external threads 234 on opposite sides of the stop collar 231. The axially inner threads 234 have a diameter for mating engagement with the threads of a bore 25. The axially outer threads 234 have a diameter for mating engagement with the threads of a fastening nut 28.

The assembly 20 is made by first inserting the axially outer end of the support bolt 26 through the bore (45 or 105) of a clamp element 29. Second, the axially outer end of the support bolt is inserted into the fastening nut 28 which is rotated on the threads 234 toward the clamp element. Third, the cap head 30 is secured on the axially outer end of the support bolt 26 using one of the techniques as disclosed herein.

Figure 7:
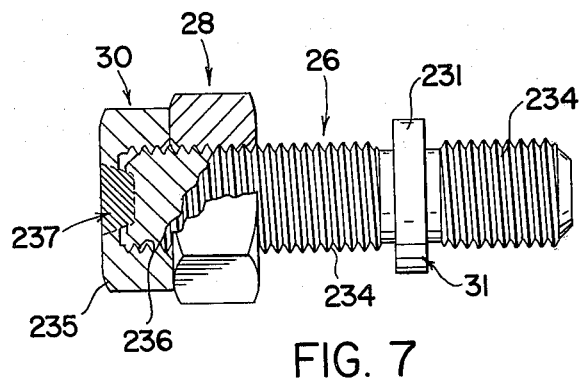
FIGS. 7 through 21 illustrate alternative techniques for securing the cap head on the support bolt, (shown as carrying a fastening nut but not showing a clamp element)
Figure 8:
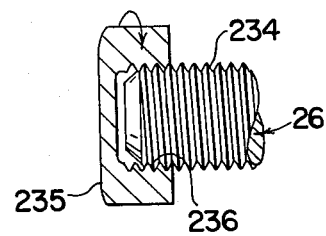

Referring to FIGS. 7 and 8, the cap head 30 may be a cap nut 235 with internal threads 236. The cap nut 235 is precisely positioned relative to the stop collar 231 during rotation thereof onto the support bolt threads 234 and then secured to the support bolt 26 by a resistance weld, as indicated at 237.

Figure 9:
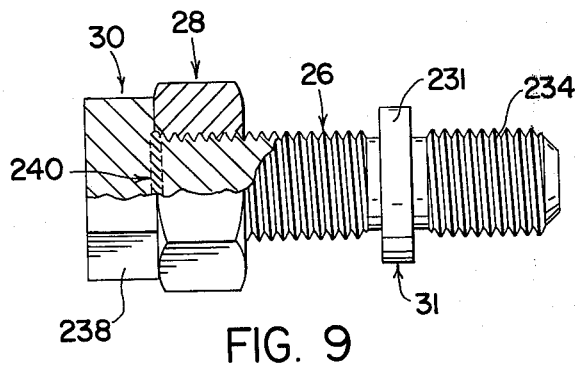
Figure 10:
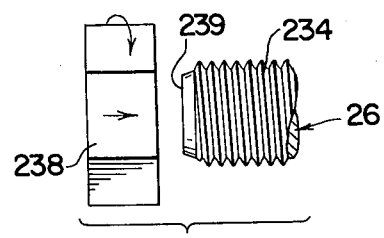

Referring to FIGS. 9 and 10, the cap head 30 may be a hex member 238 (as cut from hexagonal bar stock). The axially outer surface 239 of the support bolt 26 is precisely located relative to the stop collar 231. The hex member 238 is positioned against the bolt surface 239 and then secured to the support bolt 26 by a stud weld or friction weld, as indicated at 240.

Figure 11:
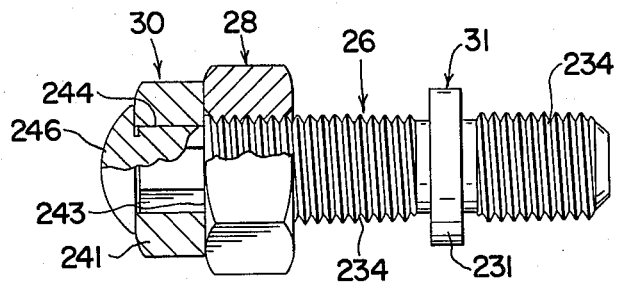
Figure 12:
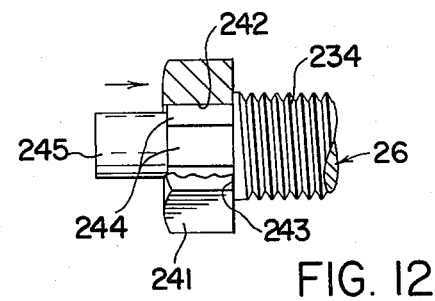

Referring to FIGS. 11 and 12, the cap head 30 may be a nut 241 with a hex bore 242. The axially outer portion of the support bolt 26 has an annular shelf surface 243, precisely located relative to the stop collar 231, hex surfaces 244, correspondingly dimensioned to the nut bore 242, and a shank portion 245. The nut 241 is positioned around the hex surfaces 244 and against the shelf surface 243 and then secured to the support bolt 26 by mechanical deformation of the shank portion 245, forming a rivet head 246.

Figure 13:
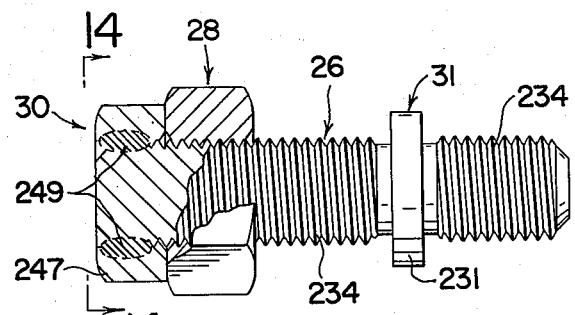
Figure 14:
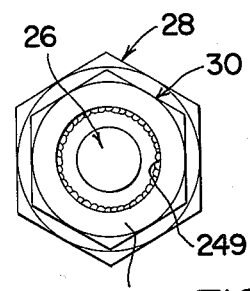
Figure 15:
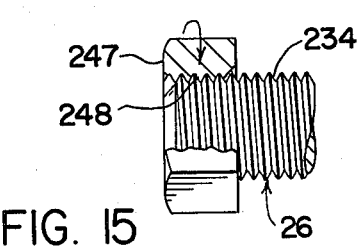

Referring to FIGS. 13, 14 and 15, the cap head 30 may be a nut 247 with internal threads 248. The nut 247 is precisely positioned relative to the stop collar 231 during rotation thereof onto the support bolt threads 244 and then secured to the support bolt 26 by a resistance weld, as indicated at 249.

Figure 16:
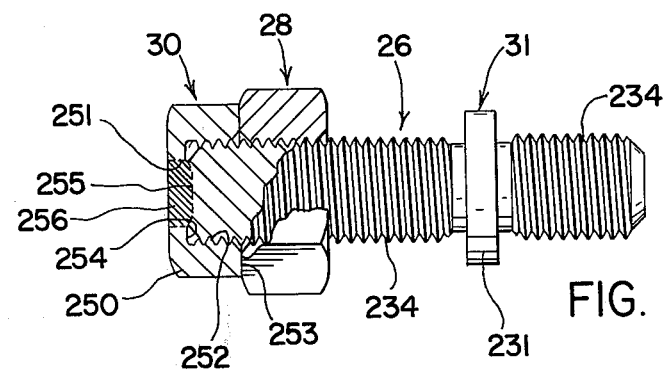

Referring to FIG. 16, the cap head 30 may be a nut 250 with an axial opening 251 and internal threads 252 and an annular collar surface 253. The nut opening 251 interiorly intersects a transverse annular surface 254 for precisely positioning the collar surface 253 relative to the stop collar 231. The axially outer surface 255 of the support bolt 26 (shown in FIG. 16 after deformation by the welding technique) is also precisely located relative to the stop collar 231. The nut 250 is rotated onto the support bolt threads 234 until the annular surface 254 contacts the bolt surface 255 and then secured to the support bolt 26 by a plug weld, as indicated at 256.

Figure 17:
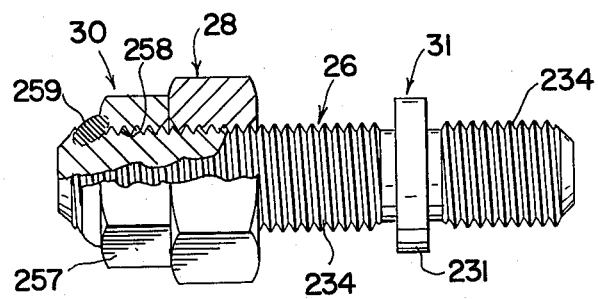
Figure 18:
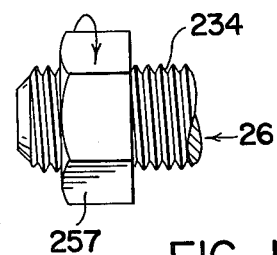

Referring to FIGS. 17 and 18, the cap head 30 may be a nut 257 with internal threads 258. The nut 257 is precisely positioned relative to the stop collar 231 during rotation thereof onto the support bolt threads 234 and then secured to the support bolt 26 by a fillet weld, as indicated at 259.

Figure 19:
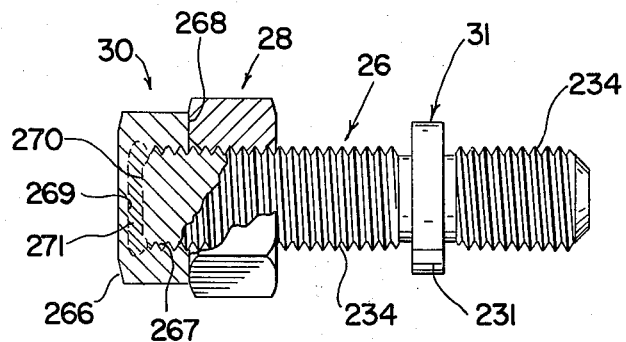

Referring to FIG. 19, the cap head 30 may be a cap nut 266 with internal threads 267 and an annular collar surface 268. The cap nut 266 has an interior transverse surface 269 (shown in FIG. 19 after deformation by the welding technique) for precisely positioning the collar surface 268 relative to the stop collar 231. The axially outer surface 270 of the support bolt 26 (also, shown in FIG. 19 after deformation by the welding technique) is also precisely located relative to the stop collar 231.

The cap nut 266 is rotated onto the support bolt threads 234 until the transverse surface 269 contacts the bolt surface 270 and then secured to the support bolt 26 by a resistance weld, as indicated at 271.

Figure 20:
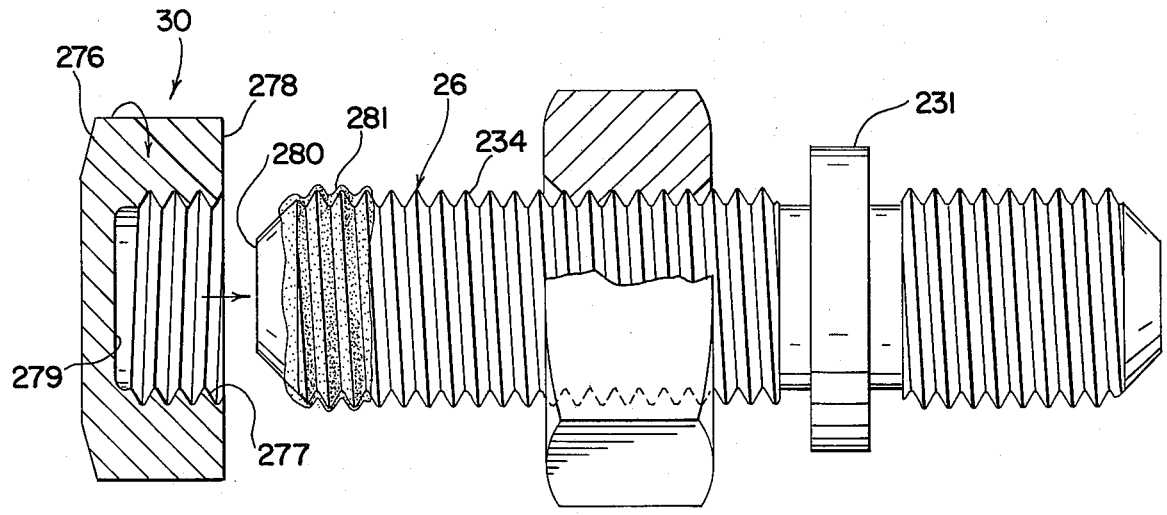
Figure 21:
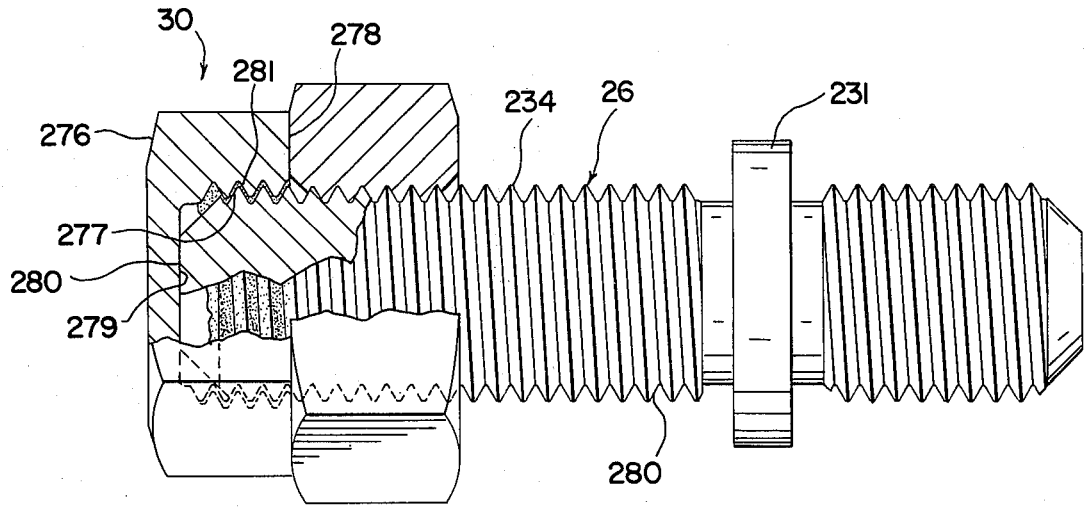

Referring to FIGS. 20 & 21, the cap head 30 may be secured to the support bolt 26 by adhesive bonding. As shown, the cap head 30 is a cap nut 276 with internal threads 277 and an annular collar surface 278. The cap nut 276 has an interior transverse surface 279 for precisely positioning the collar surface 278 relative to the stop collar 231. The axially outer surface 280 of the support bolt 26 is also precisely located relative to the stop collar 231. The cap nut 276 is rotated onto the support bolt threads 234 until the transverse surface 279 contacts the bolt surface 280 and then secured to the support bolt 26 by an adhesive bond, as indicated at 281.

The adhesive art has provided a class of sealant materials referred to as "anaerobic curing sealant compositions". This class of materials has an extended shelf life, remains pliable, in the presence of oxygen. However, when used as a bonding agent for two mating elements, assembled to provide a mechanical exclusion of atmospheric oxygen, the sealant will be activated to set and maintain the cap nut 26 in the precise location on the support bolt 26. References made to U.S. Pat. Nos. 3,043,820; 3,046,262; 3,218,315, for a disclosure of compositions for anaerobic curing sealant materials which may be used in the making of an adhesive bond 281.

What is claimed is:

1. An assembly for mounting at least one rim with a mounting flange on the felloe of a wheel,
said assembly comprising a series of threaded support bolts, fastening nuts and clamp elements,
said wheel having a series of axially directed bores adjacent said wheel felloe for rotatably receiving threads on the axially inner end of a support bolt,
each fastening nut being rotatably mounted on threads on the medial portion of a support bolt and having a radially oriented flange surface for engaging a clamp element,
each clamp element having an axially directed bore for housing a support bolt and an axially directed portion for engaging the rim mounting flange,
each support bolt having a stop collar formed integrally thereon between the threads received in a wheel bore and the threads mounting a fastening nut,
said stop collar being formed at a precise location according to predetermined functional dimensions and tolerances of said rim flange and said wheel and having an effective outer diameter greater than the inner diameter of said bore in a clamp element,
the axially outer portion of a support bolt having a cap head secured thereon after insertion of said axially outer portion through the bore of a clamp element and then through a fastening nut,
said cap head when rotated causing a fastening nut on said bolt threads to engage a clamp element and move said clamp element axially toward the rim mounting flange until said stop collar contacts said wheel,
whereby, subsequent rotation of a fastening nut away from said cap head will move a clamp element to fully seat the rim on the wheel.

2. An assembly according to claim 2, wherein said stop collar is elliptical and the said bore in the clamp element is correspondingly dimensioned providing for "key-hole" disassembly of a clamp element from said assembly.

3. An assembly according to claim 1, wherein said cap head is a cap nut with internal threads, said cap nut being precisely positioned relative to said stop collar during rotation thereof onto said support bolt threads and then secured to said support bolt by a resistance weld.

4. An assembly according to claim 1, wherein said cap head is a hex member and the axially outer surface of said support bolt is precisely located relative to said stop collar, said hex member being positioned against said bolt surface and then secured to said support bolt by a stud weld or friction weld.

5. An assembly according to claim 1, wherein said cap head is a nut with a hex bore and the axially outer portion of said support bolt has an annular shelf surface precisely located relative to said stop collar, hex surfaces correspondingly dimentioned to said nut bore, and a shank portion, said nut being positioned around said hex surfaces and against said shelf surface and then secured to said support bolt by mechanical deformation of said shank portion, forming a rivet head.

6. An assembly according to claim 1, wherein said cap head is a nut with internal threads, said cap nut being precisely positioned relative to said stop collar during rotation thereof onto said support bolt threads and then secured to said support bolt by a resistance weld.

7. An assembly according to claim 1, wherein said cap head is a nut with an axial opening and internal threads and an annular collar surface, said nut opening interiorly intersecting a transverse annular surface for precisely positioning said collar surface relative to said stop collar, the axially outer surface of said support bolt also being precisely located relative to said stop collar, said nut being rotated onto said support bolt thread until said annular surface contacts said bolt surface and then secured to said support bolt by a plug weld.

8. An assembly according to claim 1, wherein said cap head is a nut with internal threads, said nut being precisely positioned relative to said stop collar during rotation thereof onto said support bolt threads and then secured to said support bolt by a fillet weld.

9. An assembly according to claim 1, wherein said cap head is a cap nut with internal threads and an annular collar surface and an interior transverse surface for precisely positioning said collar surface relative to said stop collar, the axially outer surface of said support bolt also being precisely located relative to said stop collar, said cap nut being rotated onto said support bolt threads until said transverse surface contacts said bolt surface and then secured to said support bolt by a resistance weld.

10. An assembly according to claim 1, wherein said cap head is a cap nut with internal threads and an annular collar surface and an interior transverse surface for precisely positioning said collar surface relative to said stop collar, the axially outer surface of said support bolt also being precisely located relative to said stop collar, said cap nut being rotated onto said support bolt threads until said transverse surface contacts said bolt surface and then secured to said support bolt by an adhesive bond.

* * * * *